(12) United States Patent
Madineini et al.

(10) Patent No.: US 11,784,538 B2
(45) Date of Patent: *Oct. 10, 2023

(54) POWER TOOL USER INTERFACES (71) Applicant: Ingersoll-Rand Industrial U.S., Inc., Davidson, NC (US)

(72) Inventors: Vikram Madineini, Dusseldorf (DE); Joshua Odell Johnson, Allentown, PA (US); Douglas Fornell Leavitt, Bethlehem, PA (US); Jason Christopher Bartoszek, Bethlehem, PA (US); Sean C. Ely, Flemington, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/834,665

(22) Filed: Mar. 30, 2020

(65) Prior Publication Data
US 2020/0235643 A1 Jul. 23, 2020

Related U.S. Application Data (63) Continuation of application No. 15/172,284, filed on Jun. 3, 2016, now Pat. No. 10,615,670.
(Continued)

(51) Int. Cl.
*B25F 5/00* (2006.01)
*H02K 11/215* (2016.01)
(Continued)

(52) U.S. Cl.
CPC ............ *H02K 11/215* (2016.01); *B25F 5/001* (2013.01); *B25F 5/02* (2013.01); *H02K 7/145* (2013.01);
(Continued)

(58) Field of Classification Search
CPC ...... H02K 11/215; H02K 11/20; H02K 11/28; H02K 11/33; H02K 7/145; B25F 5/02;
(Continued)

(56) References Cited

U.S. PATENT DOCUMENTS 288,701 A 11/1883 Fell
1,495,153 A 5/1924 Benjamin
(Continued)

FOREIGN PATENT DOCUMENTS

CN 2650085 Y 10/2004
CN 1575218 A 2/2005
(Continued)

OTHER PUBLICATIONS

2145QiMax ¾" Air Impactool "Maximum Impact"; Ingersoll-Rand, Aug. 26, 2014.
(Continued)

*Primary Examiner* — Robert F Long
(74) *Attorney, Agent, or Firm* — Kevin E. West; Advent, LLP (57) ABSTRACT

A hand-held power tool is provided that includes a motive source, a user interface, and one or more sensors. The motive source includes a printed circuit board (PCB) configured to support electrical components of the motive source. The user interface is movable between a plurality of mode positions to select one of a plurality of operational modes of the motive source. And one or more sensors are mounted on the PCB and are configured to detect the plurality of mode positions of the user interface.

10 Claims, 3 Drawing Sheets

Related U.S. Application Data (60) Provisional application No. 62/171,706, filed on Jun. 5, 2015.

(51) Int. Cl.

| | | |
|---|---|---|
| *H02K 7/14* | (2006.01) | |
| *H02K 11/20* | (2016.01) | |
| *H02K 11/28* | (2016.01) | |
| *H02K 11/33* | (2016.01) | |
| *B25F 5/02* | (2006.01) | |
| *G01D 5/14* | (2006.01) | |

(52) U.S. Cl.
CPC ............ *H02K 11/20* (2016.01); *H02K 11/28* (2016.01); *H02K 11/33* (2016.01); *G01D 5/145* (2013.01)

(58) Field of Classification Search
CPC ......... B25F 5/001; G01D 5/145; F16D 48/06; F16D 48/064; B23Q 17/10; B23Q 17/007; B23Q 17/00; B23Q 17/008; B25D 16/006; B25D 16/003
USPC ........................................ 173/2–11, 176–183
See application file for complete search history.

(56) References Cited

U.S. PATENT DOCUMENTS

| | | | |
|---|---|---|---|
| 1,892,997 A | 1/1933 | Alfred et al. | |
| 2,531,800 A | 11/1950 | Anderson | |
| 2,543,979 A | 3/1951 | Maurer | |
| 2,637,825 A | 5/1953 | Moore | |
| 2,855,679 A | 10/1958 | Gibble | |
| 2,858,701 A * | 11/1958 | Willcox ................ | B23D 67/00 15/23 |
| 2,984,210 A | 5/1961 | Fuehrer | |
| 3,221,192 A | 11/1965 | Franklin | |
| 3,225,232 A | 12/1965 | Turley et al. | |
| 3,336,490 A | 8/1967 | Yelpo et al. | |
| 3,353,078 A | 11/1967 | Maynard | |
| 3,440,465 A | 4/1969 | Pratt et al. | |
| 3,451,492 A | 6/1969 | Ekstrom et al. | |
| 3,462,623 A * | 8/1969 | Batson ................... | H02K 7/145 310/50 |
| 3,476,960 A * | 11/1969 | Rees .......................... | B25F 5/02 310/216.118 |
| 3,572,447 A | 3/1971 | Pauley et al. | |
| 3,578,091 A | 5/1971 | States | |
| 3,592,087 A | 7/1971 | Pauley | |
| 3,611,095 A | 10/1971 | Schnizler | |
| 3,643,749 A | 2/1972 | Pauley | |
| 3,703,933 A | 11/1972 | Schoeps | |
| 3,710,873 A | 1/1973 | Allen | |
| 3,741,313 A | 6/1973 | States | |
| 3,760,209 A | 9/1973 | Hult | |
| 3,835,934 A | 9/1974 | Schoeps et al. | |
| 3,894,254 A | 7/1975 | Holther, Jr. | |
| 3,908,766 A | 9/1975 | Hess | |
| 3,920,082 A | 11/1975 | Dudek | |
| 4,032,806 A | 6/1977 | Seely | |
| 4,156,821 A | 5/1979 | Kurome et al. | |
| 4,284,109 A | 8/1981 | Kilmer et al. | |
| 4,292,571 A | 9/1981 | Cuneo | |
| 4,307,325 A | 12/1981 | Saar | |
| 4,412,158 A | 10/1983 | Jefferson et al. | |
| 4,454,459 A | 6/1984 | Huber | |
| 4,506,743 A | 3/1985 | Grossmann | |
| 4,510,404 A | 4/1985 | Barrett et al. | |
| 4,513,381 A | 4/1985 | Houser, Jr. et al. | |
| 4,514,172 A * | 4/1985 | Behringer ............ | A61C 1/0007 433/126 |
| 4,597,419 A | 7/1986 | Galloup et al. | |
| 4,661,756 A | 4/1987 | Murphy et al. | |
| 4,791,833 A | 12/1988 | Sakai et al. | |
| 4,795,932 A | 1/1989 | Long | |
| 4,838,361 A | 6/1989 | O'Toole | |
| 4,893,942 A | 1/1990 | Stottmann | |
| 4,978,877 A | 12/1990 | Quirijnen | |
| 4,991,472 A | 2/1991 | Hollingsworth | |
| 5,014,793 A | 5/1991 | Germanton et al. | |
| 5,105,130 A | 4/1992 | Barker et al. | |
| 5,138,243 A | 8/1992 | Kress et al. | |
| 5,200,658 A | 4/1993 | Kohno et al. | |
| 5,203,242 A | 4/1993 | Hansson | |
| 5,360,072 A | 11/1994 | Lange | |
| 5,365,155 A | 11/1994 | Zimmermann | |
| 5,473,519 A | 12/1995 | McCallops et al. | |
| 5,525,842 A | 6/1996 | Leininger | |
| 5,526,460 A | 6/1996 | DeFrancesco et al. | |
| 5,531,278 A | 7/1996 | Lin | |
| 5,553,675 A * | 9/1996 | Pitzen ..................... | H02K 7/116 173/217 |
| 5,561,734 A | 10/1996 | Simonsen et al. | |
| 5,563,482 A | 10/1996 | Shaw et al. | |
| 5,567,999 A | 10/1996 | Baronosky et al. | |
| 5,712,543 A | 1/1998 | Sjostrom | |
| 5,714,815 A | 2/1998 | Fritzinger et al. | |
| 5,714,861 A | 2/1998 | Hansen et al. | |
| 5,738,177 A | 4/1998 | Schell et al. | |
| 5,804,936 A | 9/1998 | Brodsky | |
| 5,818,142 A * | 10/1998 | Edleblute ................ | H02K 5/04 310/239 |
| 5,897,454 A | 4/1999 | Cannaliato | |
| 5,992,257 A | 11/1999 | Nemetz et al. | |
| 5,998,897 A | 12/1999 | Bosten et al. | |
| 6,037,724 A | 3/2000 | Buss et al. | |
| 6,043,575 A | 3/2000 | Ghode et al. | |
| 6,239,521 B1 * | 5/2001 | Lee ........................ | H02K 9/14 310/58 |
| 6,250,399 B1 * | 6/2001 | Giardino ................ | F01C 21/18 173/221 |
| 6,318,189 B1 | 11/2001 | Donaldson | |
| 6,353,705 B1 | 3/2002 | Capps et al. | |
| 6,359,355 B1 | 3/2002 | Hartsfield et al. | |
| 6,424,799 B1 | 7/2002 | Gilmore | |
| 6,508,313 B1 | 1/2003 | Carney et al. | |
| 6,511,200 B2 | 1/2003 | Matsunaga | |
| 6,536,536 B1 | 3/2003 | Gass et al. | |
| 6,598,684 B2 | 7/2003 | Watanabe | |
| 6,607,041 B2 | 8/2003 | Suzuki et al. | |
| 6,687,567 B2 * | 2/2004 | Watanabe ........... | B25B 23/1475 173/176 |
| 6,691,796 B1 | 2/2004 | Wu | |
| 6,713,905 B2 | 3/2004 | Hirschburger et al. | |
| 6,725,945 B2 | 4/2004 | Sugimoto et al. | |
| 6,814,461 B2 | 11/2004 | Minalga | |
| 6,933,632 B2 | 8/2005 | Braml et al. | |
| 6,945,337 B2 | 9/2005 | Kawai et al. | |
| 6,948,647 B1 | 9/2005 | Niblett et al. | |
| 6,968,908 B2 | 11/2005 | Tokunaga et al. | |
| 6,988,897 B2 | 1/2006 | Belongia et al. | |
| 7,033,137 B2 * | 4/2006 | Shufeldt ................ | F04D 23/008 416/185 |
| 7,058,291 B2 | 6/2006 | Weaver et al. | |
| 7,090,032 B2 | 8/2006 | Wada et al. | |
| 7,109,675 B2 | 9/2006 | Matsunaga et al. | |
| 7,112,934 B2 | 9/2006 | Gilmore | |
| 7,152,329 B2 | 12/2006 | Kondo et al. | |
| 7,155,986 B2 | 1/2007 | Kawai et al. | |
| 7,201,235 B2 | 4/2007 | Umemura et al. | |
| 7,213,500 B2 * | 5/2007 | Chang ..................... | B25F 5/001 91/418 |
| 7,235,940 B2 | 6/2007 | Bosch et al. | |
| 7,236,243 B2 | 6/2007 | Beecroft et al. | |
| 7,237,622 B2 | 7/2007 | Liao | |
| 7,311,027 B1 | 12/2007 | Tatsuno | |
| 7,322,427 B2 | 1/2008 | Shimma et al. | |
| 7,331,406 B2 | 2/2008 | Wottreng, Jr. et al. | |
| 7,334,648 B2 | 2/2008 | Arimura | |
| 7,372,228 B2 | 5/2008 | Hahn et al. | |
| 7,397,153 B2 | 7/2008 | Buck et al. | |
| 7,398,834 B2 | 7/2008 | Jung et al. | |

(56) References Cited

U.S. PATENT DOCUMENTS

| | | | |
|---|---|---|---|
| 7,404,450 B2* | 7/2008 | Izumisawa | B25F 5/00 173/104 |
| 7,419,013 B2 | 9/2008 | Sainomoto et al. | |
| 7,494,437 B2 | 2/2009 | Chen | |
| 7,578,357 B2 | 8/2009 | Schell | |
| 7,588,094 B2 | 9/2009 | Lin | |
| 7,600,577 B2 | 10/2009 | Simm et al. | |
| 7,607,493 B2 | 10/2009 | Erhardt | |
| 7,665,392 B2 | 2/2010 | Tokunaga et al. | |
| 7,673,370 B2* | 3/2010 | Frederick | A47L 9/2847 15/362 |
| 7,677,752 B2 | 3/2010 | Tadokoro et al. | |
| 7,705,482 B2 | 4/2010 | Leininger | |
| 7,712,546 B2 | 5/2010 | Tokunaga | |
| 7,717,192 B2 | 5/2010 | Schroeder et al. | |
| 7,718,109 B2* | 5/2010 | Robb | B33Y 50/00 264/308 |
| 7,817,384 B2* | 10/2010 | Woods | B24B 23/028 318/434 |
| 7,821,217 B2 | 10/2010 | Abolhassani et al. | |
| 7,839,112 B2 | 11/2010 | Wei | |
| 7,882,899 B2 | 2/2011 | Borinato et al. | |
| 7,928,615 B2 | 4/2011 | Miyashita et al. | |
| 7,942,211 B2 | 5/2011 | Scrimshaw et al. | |
| 7,980,320 B2 | 7/2011 | Inagaki et al. | |
| 8,016,048 B2 | 9/2011 | Ueda et al. | |
| 8,091,650 B2* | 1/2012 | Van der Linde | B25B 21/00 173/171 |
| 8,122,971 B2 | 2/2012 | Whitmire et al. | |
| 8,197,379 B1 | 6/2012 | Yin | |
| 8,210,275 B2 | 7/2012 | Suzuki et al. | |
| 8,267,924 B2 | 9/2012 | Zemlok et al. | |
| 8,294,399 B2 | 10/2012 | Suzuki et al. | |
| 8,303,449 B2 | 11/2012 | Ho et al. | |
| 8,316,741 B2* | 11/2012 | Wallgren | B25B 23/14 318/432 |
| 8,316,958 B2 | 11/2012 | Schell et al. | |
| 8,317,350 B2 | 11/2012 | Friedman et al. | |
| 8,371,708 B2 | 2/2013 | Nagasaka et al. | |
| 8,381,830 B2 | 2/2013 | Puzio et al. | |
| 8,415,911 B2 | 4/2013 | Lau et al. | |
| 8,430,180 B2 | 4/2013 | Gumpert et al. | |
| 8,430,182 B2 | 4/2013 | Soika et al. | |
| 8,496,366 B2 | 7/2013 | Leong | |
| 8,511,399 B2 | 8/2013 | Kunz | |
| 8,528,658 B2 | 9/2013 | Roehm et al. | |
| 8,541,914 B2 | 9/2013 | Knight et al. | |
| 8,584,770 B2 | 11/2013 | Zhang et al. | |
| 8,593,020 B2 | 11/2013 | Chun et al. | |
| 8,607,893 B2 | 12/2013 | Kumagai et al. | |
| 8,636,081 B2 | 1/2014 | Ludy et al. | |
| 8,674,640 B2 | 3/2014 | Suda et al. | |
| 8,708,861 B2 | 4/2014 | Inagaki et al. | |
| 8,714,888 B2 | 5/2014 | Bean et al. | |
| 8,727,034 B2 | 5/2014 | Leong et al. | |
| 8,746,364 B2 | 6/2014 | Atsumi et al. | |
| 8,757,286 B2 | 6/2014 | Nagasaka et al. | |
| 8,800,679 B2 | 8/2014 | Eshleman et al. | |
| 8,807,414 B2* | 8/2014 | Ross | A61B 17/07207 227/175.3 |
| 8,820,430 B2 | 9/2014 | Walker et al. | |
| 8,919,456 B2* | 12/2014 | Ng | B25B 23/147 173/4 |
| 8,939,228 B2 | 1/2015 | Kondo | |
| 9,089,954 B2 | 7/2015 | Roehm | |
| 9,193,055 B2 | 11/2015 | Lim et al. | |
| 9,217,492 B2 | 12/2015 | Kierspe et al. | |
| 9,220,201 B2* | 12/2015 | Krätzig | A01G 3/053 |
| 9,271,620 B2* | 3/2016 | Meredith | A47L 9/0072 |
| 9,314,855 B2* | 4/2016 | Ookubo | H02P 23/03 |
| 9,321,156 B2 | 4/2016 | Eshleman et al. | |
| 9,385,352 B2 | 7/2016 | Nguyen et al. | |
| 9,415,448 B2 | 8/2016 | Schenk et al. | |
| 9,463,563 B2 | 10/2016 | Takeuchi et al. | |
| 9,566,692 B2 | 2/2017 | Seith et al. | |
| 9,579,785 B2 | 2/2017 | Bixler et al. | |
| 9,739,366 B2 | 8/2017 | Duerr | |
| 9,827,660 B2 | 11/2017 | Blum et al. | |
| 9,950,417 B2 | 4/2018 | Ito et al. | |
| 10,046,450 B2 | 8/2018 | Bernhart et al. | |
| 10,052,733 B2 | 8/2018 | Ely et al. | |
| 10,064,639 B2* | 9/2018 | Ishida | F16D 65/18 |
| 10,418,879 B2 | 9/2019 | Bartoszek et al. | |
| 10,513,025 B2* | 12/2019 | Patel | B25D 9/08 |
| 10,518,879 B1 | 12/2019 | Zhang et al. | |
| 10,528,073 B2* | 1/2020 | Williams | G05G 1/08 |
| 10,615,670 B2 | 4/2020 | Madineni et al. | |
| 2002/0001434 A1 | 1/2002 | Kikinis | |
| 2002/0018474 A1 | 2/2002 | Assa et al. | |
| 2002/0020538 A1 | 2/2002 | Giardino | |
| 2002/0050364 A1 | 5/2002 | Suzuki et al. | |
| 2002/0096342 A1 | 7/2002 | Milbourne | |
| 2002/0108474 A1 | 8/2002 | Adams | |
| 2002/0131267 A1 | 9/2002 | Van Osenbruggen | |
| 2002/0153856 A1* | 10/2002 | Gilmore | B25B 23/147 318/599 |
| 2002/0172035 A1 | 11/2002 | Hara et al. | |
| 2002/0185514 A1 | 12/2002 | Adams et al. | |
| 2003/0002934 A1 | 1/2003 | Hsu | |
| 2003/0121679 A1 | 7/2003 | Taga | |
| 2003/0136570 A1 | 7/2003 | Izumisawa et al. | |
| 2003/0149508 A1 | 8/2003 | Watanabe | |
| 2004/0035495 A1 | 2/2004 | Hessenberger et al. | |
| 2004/0200628 A1* | 10/2004 | Schmitzer | B25D 16/006 173/1 |
| 2004/0211573 A1 | 10/2004 | Carrier et al. | |
| 2004/0217727 A1* | 11/2004 | Gilmore | B25B 23/147 318/599 |
| 2005/0040206 A1* | 2/2005 | Adams | B25C 1/008 173/117 |
| 2005/0135084 A1 | 6/2005 | Chen et al. | |
| 2005/0183870 A1 | 8/2005 | Wada et al. | |
| 2005/0224242 A1 | 10/2005 | Britz et al. | |
| 2005/0257945 A1 | 11/2005 | Justis et al. | |
| 2005/0263304 A1 | 12/2005 | Sainomoto et al. | |
| 2005/0279197 A1* | 12/2005 | Wottreng, Jr. | B25B 23/045 81/469 |
| 2006/0012584 A1 | 1/2006 | Vassallo et al. | |
| 2006/0071433 A1 | 4/2006 | Miller | |
| 2006/0109246 A1 | 5/2006 | Lee et al. | |
| 2006/0118314 A1 | 6/2006 | Aeberhard et al. | |
| 2006/0125333 A1 | 6/2006 | Wehner et al. | |
| 2006/0185865 A1* | 8/2006 | Jung | B25D 16/006 173/48 |
| 2006/0185869 A1 | 8/2006 | Arimura | |
| 2006/0201612 A1 | 9/2006 | Lin | |
| 2006/0226718 A1 | 10/2006 | Yang | |
| 2006/0237205 A1 | 10/2006 | Sia et al. | |
| 2006/0243469 A1 | 11/2006 | Webster | |
| 2007/0000676 A1 | 1/2007 | Arimura | |
| 2007/0074883 A1* | 4/2007 | Strasser | B25D 16/006 173/104 |
| 2007/0180959 A1 | 8/2007 | Tokunaga et al. | |
| 2007/0193762 A1 | 8/2007 | Arimura et al. | |
| 2007/0222310 A1 | 9/2007 | Drexlmaier | |
| 2007/0256847 A1 | 11/2007 | Wan et al. | |
| 2008/0000665 A1 | 1/2008 | Kokinelis et al. | |
| 2008/0025017 A1 | 1/2008 | Tadokoro et al. | |
| 2008/0032848 A1 | 2/2008 | Ho | |
| 2008/0048650 A1 | 2/2008 | Islam et al. | |
| 2008/0066941 A1* | 3/2008 | Kobayashi | B25F 5/00 173/218 |
| 2008/0122302 A1 | 5/2008 | Leininger | |
| 2009/0090763 A1* | 4/2009 | Zemlok | A61B 17/07207 227/175.2 |
| 2009/0098971 A1 | 4/2009 | Ho et al. | |
| 2009/0188688 A1 | 7/2009 | Gumpert et al. | |
| 2009/0200053 A1 | 8/2009 | Scrimshaw et al. | |
| 2009/0221222 A1 | 9/2009 | Lo et al. | |
| 2009/0308624 A1 | 12/2009 | Shibata et al. | |
| 2010/0000846 A1* | 1/2010 | Nemetz | H01H 25/065 200/336 |

(56) References Cited

U.S. PATENT DOCUMENTS

| | | |
|---|---|---|
| 2010/0163261 A1 | 7/2010 | Tomayko et al. |
| 2010/0175902 A1 | 7/2010 | Rejman et al. |
| 2010/0200380 A1 | 8/2010 | Staas et al. |
| 2010/0236800 A1* | 9/2010 | Watanabe ............ B25D 17/043 173/162.2 |
| 2010/0252287 A1 | 10/2010 | Morimura et al. |
| 2010/0263890 A1 | 10/2010 | Profunser et al. |
| 2010/0282482 A1 | 11/2010 | Austin et al. |
| 2010/0307782 A1 | 12/2010 | Iwata et al. |
| 2010/0326686 A1 | 12/2010 | Leong et al. |
| 2011/0000688 A1 | 1/2011 | Iwata |
| 2011/0024144 A1 | 2/2011 | Usselman et al. |
| 2011/0036605 A1 | 2/2011 | Leong et al. |
| 2011/0048750 A1 | 3/2011 | Leong et al. |
| 2011/0056715 A1 | 3/2011 | Vanko et al. |
| 2011/0073343 A1* | 3/2011 | Sawano ................ B25F 5/00 173/217 |
| 2011/0079407 A1 | 4/2011 | Iimura et al. |
| 2011/0109093 A1 | 5/2011 | Leininger |
| 2011/0127059 A1 | 6/2011 | Limberg et al. |
| 2011/0132630 A1 | 6/2011 | Kawamura et al. |
| 2011/0147028 A1 | 6/2011 | Iwashita et al. |
| 2011/0147029 A1 | 6/2011 | Roehm et al. |
| 2011/0180290 A1 | 7/2011 | Kondo |
| 2011/0188232 A1 | 8/2011 | Friedman et al. |
| 2011/0203819 A1 | 8/2011 | Tsai et al. |
| 2011/0248650 A1 | 10/2011 | Sterling et al. |
| 2011/0284256 A1 | 11/2011 | Iwata |
| 2011/0308827 A1 | 12/2011 | Kaufmann |
| 2011/0315417 A1 | 12/2011 | Matsunaga et al. |
| 2012/0013829 A1 | 1/2012 | Song et al. |
| 2012/0019080 A1* | 1/2012 | Kottmyer ............ H02K 5/1732 310/43 |
| 2012/0055690 A1 | 3/2012 | Uemura |
| 2012/0089131 A1* | 4/2012 | Zemlok ................ A61B 17/285 606/1 |
| 2012/0090863 A1 | 4/2012 | Puzio et al. |
| 2012/0132449 A1 | 5/2012 | Hecht et al. |
| 2012/0138329 A1 | 6/2012 | Sun et al. |
| 2012/0175142 A1 | 7/2012 | Van Der Linde et al. |
| 2012/0205131 A1 | 8/2012 | Furusawa et al. |
| 2012/0234568 A1 | 9/2012 | Schnell et al. |
| 2012/0273242 A1 | 11/2012 | Eshleman et al. |
| 2012/0279736 A1 | 11/2012 | Tanimoto et al. |
| 2012/0292071 A1 | 11/2012 | Su et al. |
| 2012/0292472 A1 | 11/2012 | Segura et al. |
| 2012/0318544 A1 | 12/2012 | Sun et al. |
| 2012/0318549 A1 | 12/2012 | Nagasaka et al. |
| 2013/0014967 A1 | 1/2013 | Ito et al. |
| 2013/0033217 A1 | 2/2013 | Hirabayashi |
| 2013/0056235 A1* | 3/2013 | Pozgay ................ H02P 7/29 173/29 |
| 2013/0056236 A1 | 3/2013 | Morinishi et al. |
| 2013/0062086 A1 | 3/2013 | Ito et al. |
| 2013/0062088 A1 | 3/2013 | Mashiko et al. |
| 2013/0062498 A1 | 3/2013 | Ito et al. |
| 2013/0068491 A1 | 3/2013 | Kusakawa et al. |
| 2013/0075121 A1 | 3/2013 | Nakamura et al. |
| 2013/0087355 A1 | 4/2013 | Oomori et al. |
| 2013/0105189 A1 | 5/2013 | Murthy et al. |
| 2013/0108385 A1 | 5/2013 | Woelders |
| 2013/0126202 A1 | 5/2013 | Oomori et al. |
| 2013/0133912 A1 | 5/2013 | Mizuno et al. |
| 2013/0153252 A1 | 6/2013 | Sakakibara |
| 2013/0153253 A1 | 6/2013 | Ludy et al. |
| 2013/0161040 A1 | 6/2013 | Tomayko et al. |
| 2013/0175066 A1 | 7/2013 | Zhang et al. |
| 2013/0186661 A1 | 7/2013 | Okubo et al. |
| 2013/0186666 A1 | 7/2013 | Yoshino et al. |
| 2013/0193891 A1 | 8/2013 | Wood et al. |
| 2013/0206434 A1 | 8/2013 | Braun |
| 2013/0206435 A1 | 8/2013 | Papp |
| 2013/0213680 A1 | 8/2013 | Chen |
| 2013/0220655 A1 | 8/2013 | Tomayko |
| 2013/0228353 A1 | 9/2013 | Chen et al. |
| 2013/0228356 A1 | 9/2013 | Hayes et al. |
| 2013/0240230 A1 | 9/2013 | Saur |
| 2013/0247706 A1 | 9/2013 | Duerr |
| 2013/0267374 A1 | 10/2013 | Blum et al. |
| 2013/0269961 A1 | 10/2013 | Lim et al. |
| 2013/0270932 A1 | 10/2013 | Hatfield et al. |
| 2013/0270934 A1 | 10/2013 | Smith et al. |
| 2013/0274797 A1 | 10/2013 | Nicholas et al. |
| 2013/0284480 A1 | 10/2013 | Horie et al. |
| 2013/0292147 A1 | 11/2013 | Mergener et al. |
| 2013/0313925 A1 | 11/2013 | Mergener et al. |
| 2013/0327552 A1 | 12/2013 | Lovelass et al. |
| 2013/0331994 A1* | 12/2013 | Ng ........................ G05B 15/02 700/275 |
| 2013/0333904 A1 | 12/2013 | Raggl et al. |
| 2013/0333910 A1 | 12/2013 | Tanimoto et al. |
| 2013/0342084 A1 | 12/2013 | Su |
| 2014/0015383 A1 | 1/2014 | Kokinelis et al. |
| 2014/0026723 A1 | 1/2014 | Persson et al. |
| 2014/0036482 A1 | 2/2014 | Vanko et al. |
| 2014/0058390 A1 | 2/2014 | Taylor et al. |
| 2014/0069676 A1 | 3/2014 | Abante et al. |
| 2014/0096985 A1 | 4/2014 | Chu et al. |
| 2014/0100687 A1 | 4/2014 | Ekstrom et al. |
| 2014/0102741 A1 | 4/2014 | Sekino et al. |
| 2014/0138111 A1 | 5/2014 | Takeuchi et al. |
| 2014/0158390 A1 | 6/2014 | Mashiko et al. |
| 2014/0166326 A1 | 6/2014 | Le Du et al. |
| 2014/0182869 A1 | 7/2014 | Kumagai et al. |
| 2014/0182870 A1 | 7/2014 | Herr |
| 2014/0209342 A1 | 7/2014 | Chen |
| 2014/0290973 A1 | 10/2014 | Lin |
| 2014/0338503 A1 | 11/2014 | Beer et al. |
| 2014/0365012 A1 | 12/2014 | Chen et al. |
| 2014/0367134 A1 | 12/2014 | Phillips et al. |
| 2015/0014010 A1 | 1/2015 | Chang |
| 2015/0041163 A1 | 2/2015 | McClung |
| 2015/0047866 A1 | 2/2015 | Sakai et al. |
| 2015/0047943 A1 | 2/2015 | Park |
| 2015/0122521 A1 | 5/2015 | Chen et al. |
| 2015/0122523 A1 | 5/2015 | Yamamoto et al. |
| 2015/0122524 A1 | 5/2015 | Papp |
| 2015/0129248 A1 | 5/2015 | Nitsche et al. |
| 2015/0136433 A1 | 5/2015 | Nitsche et al. |
| 2015/0144365 A1 | 5/2015 | Hirabayashi et al. |
| 2015/0151424 A1 | 6/2015 | Elder et al. |
| 2015/0171654 A1 | 6/2015 | Horie et al. |
| 2015/0197003 A1 | 7/2015 | Lin et al. |
| 2015/0202759 A1 | 7/2015 | Wang |
| 2015/0209948 A1 | 7/2015 | Hecht et al. |
| 2015/0222162 A1* | 8/2015 | Pinkley .................... H02K 9/00 310/54 |
| 2015/0328760 A1 | 11/2015 | Ikuta et al. |
| 2015/0336249 A1 | 11/2015 | Iwata et al. |
| 2016/0102762 A1 | 4/2016 | Brennenstuhl et al. |
| 2016/0118201 A1* | 4/2016 | Nicholas ................ H01H 13/14 606/1 |
| 2016/0131353 A1 | 5/2016 | Bartoszek |
| 2016/0176027 A1 | 6/2016 | Aoyagi |
| 2016/0193673 A1* | 7/2016 | Yoshida ................ B23D 47/12 30/388 |
| 2016/0250738 A1 | 9/2016 | Leh et al. |
| 2016/0311094 A1 | 10/2016 | Mergener et al. |
| 2016/0354889 A1 | 12/2016 | Ely et al. |
| 2016/0354905 A1 | 12/2016 | Ely et al. |
| 2016/0354915 A1 | 12/2016 | Bartoszek et al. |
| 2017/0222382 A1* | 8/2017 | Peloquin ................ H01R 27/02 |
| 2017/0225309 A1 | 8/2017 | Meyer |
| 2018/0161951 A1 | 6/2018 | Billings et al. |

FOREIGN PATENT DOCUMENTS

| | | |
|---|---|---|
| CN | 1583370 A | 2/2005 |
| CN | 101253015 A | 8/2008 |
| CN | 103481251 A | 1/2014 |
| CN | 103989497 A | 8/2014 |
| CN | 104162880 A | 11/2014 |

(56) References Cited

FOREIGN PATENT DOCUMENTS

| | | | |
|---|---|---|---|
| CN | 104676315 A | 6/2015 | |
| DE | 19518591 A1 | 12/1996 | |
| DE | 102004051913 A1 | 2/2006 | |
| DE | 102005015900 A1 | 2/2006 | |
| DE | 202006018761 U1 | 2/2007 | |
| DE | 102006000543 A1 | 6/2008 | |
| DE | 102008020173 A1 | 10/2009 | |
| DE | 102012211914 A1 | 10/2013 | |
| DE | 102015006042 A1 * | 11/2015 | B24B 23/03 |
| DE | 202016104126 U1 | 8/2016 | |
| EP | 0271903 A2 | 6/1988 | |
| EP | 0585541 A2 | 3/1994 | |
| EP | 0585541 A3 | 11/1994 | |
| EP | 0585541 B1 | 9/1997 | |
| EP | 0808018 A1 * | 11/1997 | |
| EP | 0911119 A2 | 4/1999 | |
| EP | 1426989 A1 | 6/2004 | |
| EP | 1524085 A2 | 4/2005 | |
| EP | 1595649 A2 | 11/2005 | |
| EP | 1595650 A2 | 11/2005 | |
| EP | 1867438 A2 | 12/2007 | |
| EP | 1943061 A2 | 7/2008 | |
| EP | 1982798 A2 | 10/2008 | |
| EP | 1207016 B1 | 1/2009 | |
| EP | 2042271 A2 | 4/2009 | |
| EP | 2062670 A2 | 5/2009 | |
| EP | 2062700 A2 | 5/2009 | |
| EP | 1524084 B1 | 8/2009 | |
| EP | 2075094 B1 | 2/2011 | |
| EP | 1447177 B1 | 4/2011 | |
| EP | 2256899 B1 | 8/2011 | |
| EP | 2184138 A3 | 12/2011 | |
| EP | 2524775 A2 | 11/2012 | |
| EP | 2535150 A2 | 12/2012 | |
| EP | 2687338 A1 | 1/2014 | |
| GB | 752251 A | 7/1956 | |
| GB | 1068990 A | 5/1967 | |
| GB | 1413293 A | 11/1975 | |
| GB | 2396390 A | 6/2004 | |
| GB | 2514261 A | 11/2014 | |
| JP | H08193896 A | 7/1996 | |
| JP | H08294878 A | 11/1996 | |
| JP | 2000218561 A | 8/2000 | |
| JP | 2002331427 A | 11/2002 | |
| JP | 2004202600 A | 7/2004 | |
| JP | 2004239681 A | 8/2004 | |
| JP | 2005254400 A | 9/2005 | |
| JP | 2006272488 A | 10/2006 | |
| JP | 2006312210 A | 11/2006 | |
| JP | 2009269137 A | 11/2009 | |
| JP | 2010012585 A | 1/2010 | |
| JP | 2011031369 A | 2/2011 | |
| JP | 2011067910 A | 4/2011 | |
| JP | 2011230272 A | 11/2011 | |
| JP | 2012035358 A | 2/2012 | |
| JP | 2012149669 A | 8/2012 | |
| RU | 2360786 C2 | 7/2009 | |
| TW | 201231843 A | 8/2012 | |
| WO | 9853959 A1 | 12/1998 | |
| WO | 0064639 A1 | 11/2000 | |
| WO | 0144776 A1 | 6/2001 | |
| WO | 0154865 A2 | 8/2001 | |
| WO | 0230624 A2 | 4/2002 | |
| WO | 02058891 A1 | 8/2002 | |
| WO | 2004029569 A1 | 4/2004 | |
| WO | WO-2006111173 A1 * | 10/2006 | A61B 17/1613 |
| WO | 2009011633 A1 | 1/2009 | |
| WO | 2010110716 A1 | 9/2010 | |
| WO | 2011013852 A1 | 2/2011 | |
| WO | 2011099487 A1 | 8/2011 | |
| WO | 2011102559 A1 | 8/2011 | |
| WO | 2012002578 A1 | 1/2012 | |
| WO | 2012023452 A1 | 2/2012 | |
| WO | 2013037325 A1 | 3/2013 | |
| WO | 2013164905 A1 | 11/2013 | |
| WO | 2013183535 A1 | 12/2013 | |
| WO | 2014098256 A1 | 6/2014 | |
| WO | 2014108110 A1 | 7/2014 | |
| WO | 2014124859 A1 | 8/2014 | |
| WO | 2016196899 A1 | 12/2016 | |

OTHER PUBLICATIONS

3W Portable Rechargeable LED Work Light with Magnetic Base Power Car Charger, from: http://www.ebay.com/itm/like/141277021128?1pid=82; dated Sep. 10, 2014.
Ac85-265v Or Dc12v/24v Epistar Cob Led Chip Led Work Flashlight, from: http://www.alibaba.com/product-detail!AC85-265v-or-dc 12v-24v-epistar_ 1450867344.html ; dated Sep. 10, 2014.
Ace LED Work Light with Stand; Retrieved on Sep. 2, 2014 from: http://www.acehardware.com/product/index.jsp?productId=19607576; dated Sep. 2, 2014.
"Air Impact Wrench 588A1 Maintenance Information"; Ingersoll-Rand, Nov. 1, 2007.
ATD 80304 Saber 3Watt Cob LED Strip Light Plus 2.4watt Top Light, from: https://www.google.com/shopping/product/3819105557822370488?q=COB+LED+flashiight&espv=2&biw=1680&bih=949&bav=on.2; dated Sep. 10, 2014.
ATD Tools 80335 35W Cob LED Worklight w/Stand, from: https://www.google.com/shopping/product/16993246027546592360?q=COB+LED+flashlight&espv=2&biw=1680&bih=949&bav=on.2; dated Sep. 10, 2014.
CLIPSTRIP™ AQUA—Waterproof & Rechargeable LED Strip Light, from: http://www.cliplight.com/automotive/lighting/compact-series/clipstrip-aqu a/; Dated Sep. 10, 2014.
CN I 04676315 Dated Jun. 3, 2015, Chou; English Translation.
Dial a Speed; Taken from the Internet on Aug. 29, 2014 from http://makezine.com/projects/the-dial-a-speed/.
Examination Report for European Application No. 16804498.8, dated May 29, 2019.
Examination Report for European Application No. 16804555.7, dated Feb. 2, 2021.
Extended European Search Report for European Application 16804509.4, dated Feb. 20, 2019.
Extended European Search Report for European Application No. 16804498.0, dated Sep. 25, 2018.
Extended European Search Report for European Application No. 16804555.7, dated May 13, 2019 (Date completed May 2, 2019).
Extended European Search Report for European Application No. EP 16804517.7, dated Dec. 4, 2018.
Festool RO 90 DX; Taken from the internet on Aug. 29, 2014 from http://www.thewoodnerd.com/reviews/festoolR090DX.html.
Hot Sell High Brightness Cob Flashlight, from http://www.alibaba.com/product-detailHot-sell-high-brightn ess-COB-Flashlight_ 850789033.html; dated Sep. 10, 2014.
International Search Report and Written Opinion for PCT/US2016/035665, dated Aug. 26, 2016.
International Search Report and Written Opinion for PCT/US2016/035681, dated Sep. 6, 2016.
International Search Report and Written Opinion for PCT/US2016/035698, dated Aug. 31, 2016.
International Search Report and Written Opinion for PCT/US2016/035797, dated Sep. 2, 2016.
International Search Report and Written Opinion for PCT/US2016/035807, dated Oct. 7, 2020.
International Search Report for PCT/US2016/035674, dated Sep. 14, 2016.
Jimmy Houston Folding Flip Light; Retrieved on Sep. 2, 2014 from: http://www.walmart.com/ip/20512279?wmlspartner=wlpa&adid=22222222227014895251&wlO=&wll=g&wl2=c&wl3=40969534952&w14=&wl5=pla&wl6=78912422192&veh=sem#ProductDetail; dated Sep. 2, 2014.
Laser-Flex 2D by Penn Tool Co.; Retrieved on Sep. 2, 2014 from: http://www.penntoolco.com/catalog/products/products.cfm?categoryiD=1351; dated Sep. 2, 2014.

(56) References Cited

OTHER PUBLICATIONS

"Life Box Series by Streamlight"; Retrieved on Sep. 2, 2014 from: http://www.streamlight.com/en-ca/product/class.html?cid=6; dated Sep. 2, 2014.
Makita Flashlight, ML140, 14.4V, from http://www.globalindustrial.com/p/tools/portable-worklights/Flashlights-Handheld/flashlight-ml140-144 v; dated Sep. 10, 2014.
Office Action for Chinese Application No. 201680031397.8, dated Dec. 5, 2018.
Office Action for Chinese Application No. 201680031488.1, dated Dec. 11, 2018.
Office Action for Chinese Application No. 201680031710.8, dated Dec. 18, 2018.
Office Action for Chinese Application No. 201680031738.1, dated Dec. 18, 2018.
Office Action for Chinese Patent Application No. 201680031739.6, dated Nov. 20, 2020.
Office Action for Chinese Patent Application No. 201680031740.9, dated Nov. 23, 2020.
Partial Supplementary European Search Report for European Application No. 16804555.7, dated Jan. 18, 2019 (Search completed Jan. 9, 2019).
PELICAN Remote Area Lighting; Retrieved on Sep. 2, 2014 from: http://www.grainger.com/product/PELICAN-Remote-Area-Lighting-System-5RZY8?s_pp=false&picUrl=//static.grainger.com/rp/s/is/image/Grainger/5RZY8ASO1?$smthumb$; dated Sep. 2, 2014
Supplemental European Search Report for European Application 16804550, dated Dec. 19, 2018.
Supplementary European Search Report for European Application No. 16804505, dated Jan. 28, 2018.
SYCLONE by Streamlight; Retrieved on Sep. 2, 2014 from http://www.smokesign.com/syrefl.html; dated Sep. 2, 2014.
Zoro LED Worklight by Cooper; Retrieved on Sep. 2, 2014 from: http://www.zoro.com/i/G4585287/?utm_source=google_ shopping &utm_medium=cpc&utm_campaign=Google_Shopping_Feed&gclid=CPm46JHwwsACFRMLMgod_H8AyA; dated Sep. 2, 2014.
Examination Report for European Application No. 16804555.7, dated Feb. 1, 2022.
Examination Report for European Application No. 16804555.7, dated May 13, 2022.
Examination Report for European Application No. 16804555.7, dated Sep. 7, 2021.
International Search Report for European Application No. 16804505.2, dated Feb. 4, 2019.
Office Action dated Oct. 16, 2017; U.S. Appl. No. 15/172,247.

\* cited by examiner

POWER TOOL USER INTERFACES

RELATED APPLICATION

The present application relates to and claims priority to U.S. Provisional Patent Application, Ser. No. 62/171,706, filed on Jun. 5, 2015, entitled "Power Tool User Interfaces," and U.S. Pat. No. 10,615,670, filed on Jun 3, 2016, entitled "Power Tool User Interfaces." The subject matter disclosed in the related applications is hereby expressly incorporated into the present application.

TECHNICAL FIELD AND SUMMARY

The present disclosure relates, generally, to power tools and, more particularly, to user interfaces for power tools.

User interfaces for power tools sometimes include controls for regulating power supplied to electric motors of the power tools. For instance, such user interfaces may include one or more switches or knobs that are movable between positions to adjust the power supplied to the motive source or electric motor. Some power tools may include features that guide movement of the switches between the positions and provide feedback to a user regarding the positional state of the switches.

To that end, an illustrative embodiment of the present disclosure provides hand-held power tool which comprises a motive source, an output shaft, an endbell, a user interface, a printed circuit board (PCB), a plurality of sensors, and one or more sensor actuators. The output shaft protrudes from an output end of the motive source. The output shaft is functionally coupled to the motive source such that the output shaft rotates in response to activation of the motive source when the motive source is supplied with power. The endbell is located adjacent the motive source opposite the output shaft. The user interface is movable among a plurality of mode positions to select one of a plurality of operation modes of the motive source. The user interface includes a control knob accessible from the exterior of the housing assembly. The control knob is located adjacent the endbell opposite the output shaft, and rotatable about a knob axis to a plurality of mode positions that correspond to the plurality of operation modes. The PCB is located between the endbell and the control knob, wherein the PCB is configured to control the plurality of operation modes of the motive source. The plurality of sensors are positioned on an outer side of the PCB. Each of the plurality of sensors identifies a location of one of the plurality of mode positions. One or more of the sensor actuators are located on the control knob. Each of the one or more sensor actuators are located on the control knob movable to a position that corresponds to one of the plurality of sensors that correspond to a location of one of the plurality of mode positions. And lastly, the plurality of sensors and the one or more sensor actuators do not physically make contact.

In the above and other embodiments of the present disclosure may also comprise: the plurality of sensors being Hall-effect sensors; the one or more sensor actuators are at least one magnet, wherein the at least one magnet is selectively locatable adjacent one of the plurality of Hall-effect sensors that corresponds to the location of one of the plurality of mode positions; the one or more sensor actuators is a magnet, wherein the magnet is selectively locatable adjacent one of the plurality of Hall-effect sensors, wherein a magnetic field generated by the magnet when located adjacent a first of the plurality of Hall-effect sensors excites the first of the plurality of Hall-effect sensors to indicate to a controller on the hand-held power tool to operate in a first operation mode of the plurality of operation modes, wherein a magnetic field generated by the magnet when located adjacent a second of the plurality of Hall-effect sensors excites the second of the plurality of Hall-effect sensors to indicate to the controller on the hand-held power tool to operate in a second operation mode of the plurality of operation modes, and wherein a magnetic field generated by the magnet when located adjacent a third of the plurality of Hall-effect sensors excites the third of the plurality of Hall-effect sensors to indicate to the controller on the hand-held power tool to operate in a third operation mode of the plurality of operation modes; when the control knob is located at a fourth mode position, the magnet is not located adjacent any of the plurality of Hall-effect sensors and thus, does not excite any of the plurality of Hall-effect sensors, wherein this lack of excitement of any of the plurality of Hall-effect sensors indicates to the controller on the hand-held power tool to operate in a fourth operation modes of the plurality of operation modes; when the control knob is located at a fourth mode position, the magnet is positioned adjacent a fourth Hall-effect sensor, wherein the magnetic field generated by the magnet excites the fourth Hall-effect sensor to indicate to the controller on the hand-held power tool to operate in a fourth mode of operation of the plurality of operation modes; and the one or more sensor actuators located on the control knob is composed of two magnets and the plurality of sensors on the PCB are composed of two Hall-effect sensors that correspond to define four operation modes of the plurality of operation modes.

Another illustrative embodiment of the present disclosure provides a hand-held power tool which comprises a motive source, an output shaft, an endbell, a user interface, a PCB, a potentiometer, and a plunger. The output shaft protrudes from an output end of the motive source. The output shaft is functionally coupled to the motive source such that the output shaft rotates in response to activation of the motive source when the motive source is supplied with power. The endbell is located adjacent the motive source opposite the output shaft. The user interface is movable among a plurality of mode positions to select one of a plurality of operation modes of the motive source, and includes a control knob accessible from exterior of the housing assembly. The control knob is located adjacent the endbell opposite the output shaft, and is rotatable about a knob axis to a plurality of mode positions that correspond to a plurality of operation modes. The PCB is located between the endbell and the control knob, and is configured to control the plurality of operation modes of the motive source. The potentiometer is located on the PCB wherein the potentiometer is located adjacent the control knob. The plunger is located on the control knob and directed toward the potentiometer. The plunger interacts with the potentiometer and is configured to change an output current based on a variable resistance created by a relative location of the plunger with respect to the potentiometer.

In the above and other embodiments of the present disclosure may also comprise: the potentiometer being an arcuate potentiometer; a membrane located between the potentiometer and the plunger; the plunger being positioned on the control knob such that the plunger contacts the membrane and configured to change the resistance of the potentiometer based on the relative location of the plunger with respect to the potentiometer and the membrane; when the plunger contacts the membrane at a first position the potentiometer has a first resistance that is sent to a controller to indicate a first operation mode of the plurality of operation modes, wherein when the plunger contacts the membrane at a second position the potentiometer has a second resistance that is sent to the controller to indicate a second operation mode of the plurality of operation modes, wherein when the plunger contacts the membrane at a third position the potentiometer has a third resistance that is sent to the controller to indicate a third operation mode of the plurality of operation modes, and wherein when the plunger contacts the membrane at a fourth position the potentiometer has a fourth resistance that is sent to the controller to indicate a fourth operation mode of the plurality of operation modes; and the plunger and the potentiometer are adapted to withstand vibrations caused by operation of the hand-held power tool.

Another illustrative embodiment of the present disclosure provides hand-held power tool which comprises a motive source, an output shaft, an endbell, a user interface, and a PCB. The output shaft protrudes from an output end of the motive source. The output shaft is functionally coupled to the motive source such that the output shaft rotates in response to activation of the motive source when the motive source is supplied with power. The endbell is located adjacent the motive source opposite the output shaft. The user interface is movable among a plurality of mode positions to select one of a plurality of operation modes of the motive source. The user interface is also accessible from exterior of the housing assembly, and is located adjacent the endbell opposite the output shaft. The user interface adjusts operation of the hand-held power tool to the plurality of operation modes. The PCB is located between the endbell and the user interface, and is configured to interact with the user interface to select one of the plurality of operation modes of the motive source.

In the above and other embodiments of the present disclosure may also comprise: the user interface being selected from the group consisting of a control knob, dial, push button, switch, lever, and touch screen; the PCB includes a plurality of sensors positioned on the PCB wherein each of the plurality of sensors identify a location of one of the plurality of mode positions; one or more sensor actuators located on the user interface, wherein the one or more sensors are movable to a position that corresponds to one of the plurality of sensors that correspond to a location of one of the plurality of mode positions; a potentiometer located on the PCB wherein the potentiometer is directed to the user interface, and a plunger in communication with the user interface and interacts with the potentiometer; and wherein the potentiometer is configured to change an output current based on a variable resistance created by a relative location of the plunger with respect to the potentiometer; and the PCB includes a shield to mitigate interference to the motive source.

Another illustrative embodiment of the present disclosure provides hand-held power tool which comprises: a motor, a user interface, and one or more sensors. The motor includes a PCB configured to support electrical components of the motor. The user interface is movable between a plurality of mode positions to select one of a plurality of operational modes of the motor. And one or more sensors are mounted on the PCB and are configured to detect the plurality of mode positions of the user interface.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
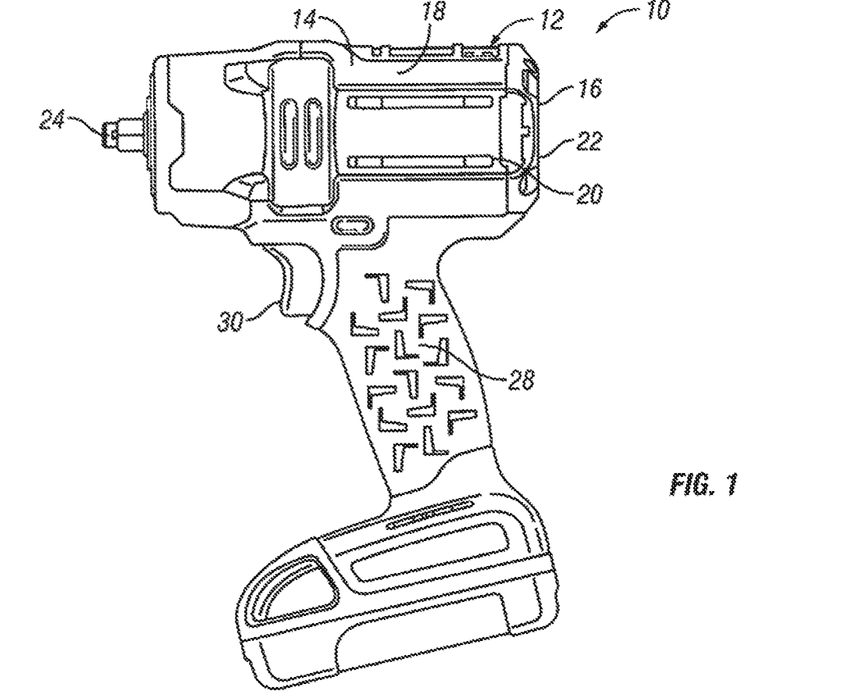
FIG. 1 is a side elevation view of an illustrative power tool including a tool housing.

Referring now to FIG. 1, an illustrative power tool 10 is shown. The power tool 10 is illustratively embodied as a cordless, electric power tool. In particular, the power tool 10 is shown in FIG. 1 as a pistol-grip style cordless electric impact tool, which includes an impact mechanism in-line with an output of the tool. It should be appreciated, however, that in other embodiments, the power tool may be embodied as another type of impact tool or as a cordless, electric power tool that does not include an impact mechanism, such as an electric drill, drill driver, ratchet, saw, or the like.

The illustrative power tool 10 includes a tool housing 12 as shown in FIG. 1. The tool housing 12 includes a body 14 and a cap 16. The body 14 defines an interior space 18 in which a motive source 20 of the power tool 10 is positioned. The cap 16 is coupled to the body 14 when the power tool 10 is assembled to close off the interior space 18 and define an end 22 that is positioned opposite an output end 24 of the power tool 10. The cap 16 is coupled to the body 14 using fasteners 26 (best seen in FIG. 2) that extend through the cap 16 and into the interior space 18. It is appreciated that motive source 20 may be an electric motor (either corded or cordless) or a pneumatic air motor.

Figure 2:
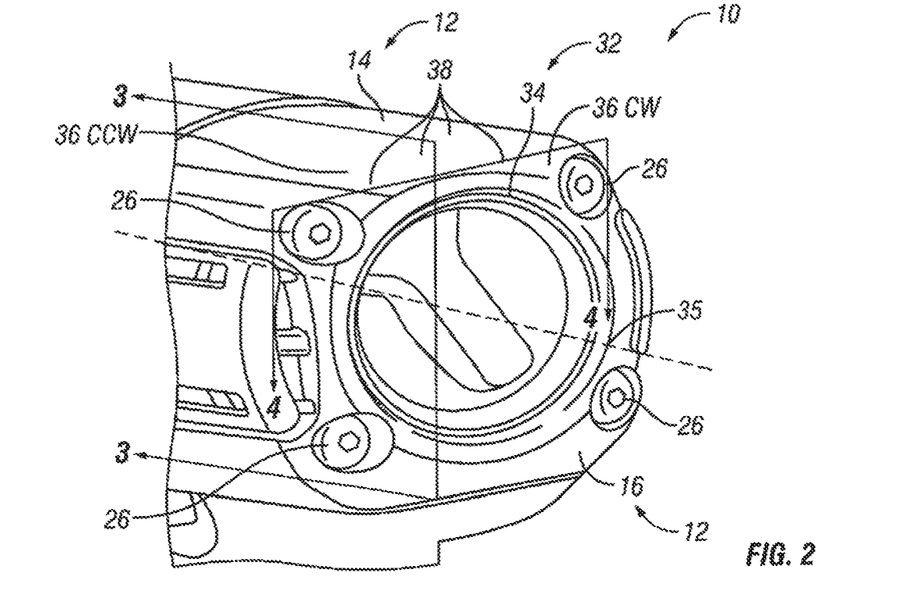
FIG. 2 is a perspective view of a user interface provided on a rear portion of the tool housing of the power tool of FIG. 1 with remaining portions of the tool housing omitted for the sake of clarity.

The tool housing 12 defines a handle 28 on which a trigger 30 is provided as shown in FIG. 1. The trigger 30 is used to turn the motive source 20 on/off in use of the power tool 10. It is appreciated that the trigger may include a button, be touch sensitive, or employ a like switch. A user interface 32 spaced from the trigger 30 is also provided on the tool housing 12, specifically on the cap 16, as best seen in FIG. 2. In the illustrative embodiment, the user interface 32 is used to select one of a plurality of modes of operation of the power tool 10. For instance, in some embodiments, the user interface 32 may be used to select a particular mode of operation from among those described in U.S. Provisional Patent Application Ser. No. 62/171,504, filed Jun. 5, 2015.

In other embodiments, the user interface 32 may simply regulate the maximum power supplied to the motive source 20 when the trigger 30 is fully depressed in use of the power tool 10.

Referring now to FIG. 2, the user interface 32 is shown in greater detail. The user interface 32 is supported by the tool housing 12 and is illustratively embodied as, or otherwise includes, a control knob 34. It should be appreciated, however, that in other embodiments, the user interface 32 may be embodied as a dial, push button, switch, or other control, and the dial, push button, switch, or other control, as well as components associated therewith, may be supported by the tool housing 12.

The control knob 34 is accessible from the exterior of the tool housing 12, and the control knob 34 is engaged with the cap 16 (best seen in FIG. 3) and rotatable about a knob axis 36 between a number of mode positions 38. Operation of the motive source 20 when the control knob 34 is in one of the mode positions 38 is different from the operation of the motive source 20 when the control knob 34 is in any of the other mode positions 38. In the illustrative embodiment, the mode positions 38 include four different positions. It should be appreciated, however, that in other embodiments, the control knob 34 may be moved between more or less than four mode positions 38.

Figure 3:
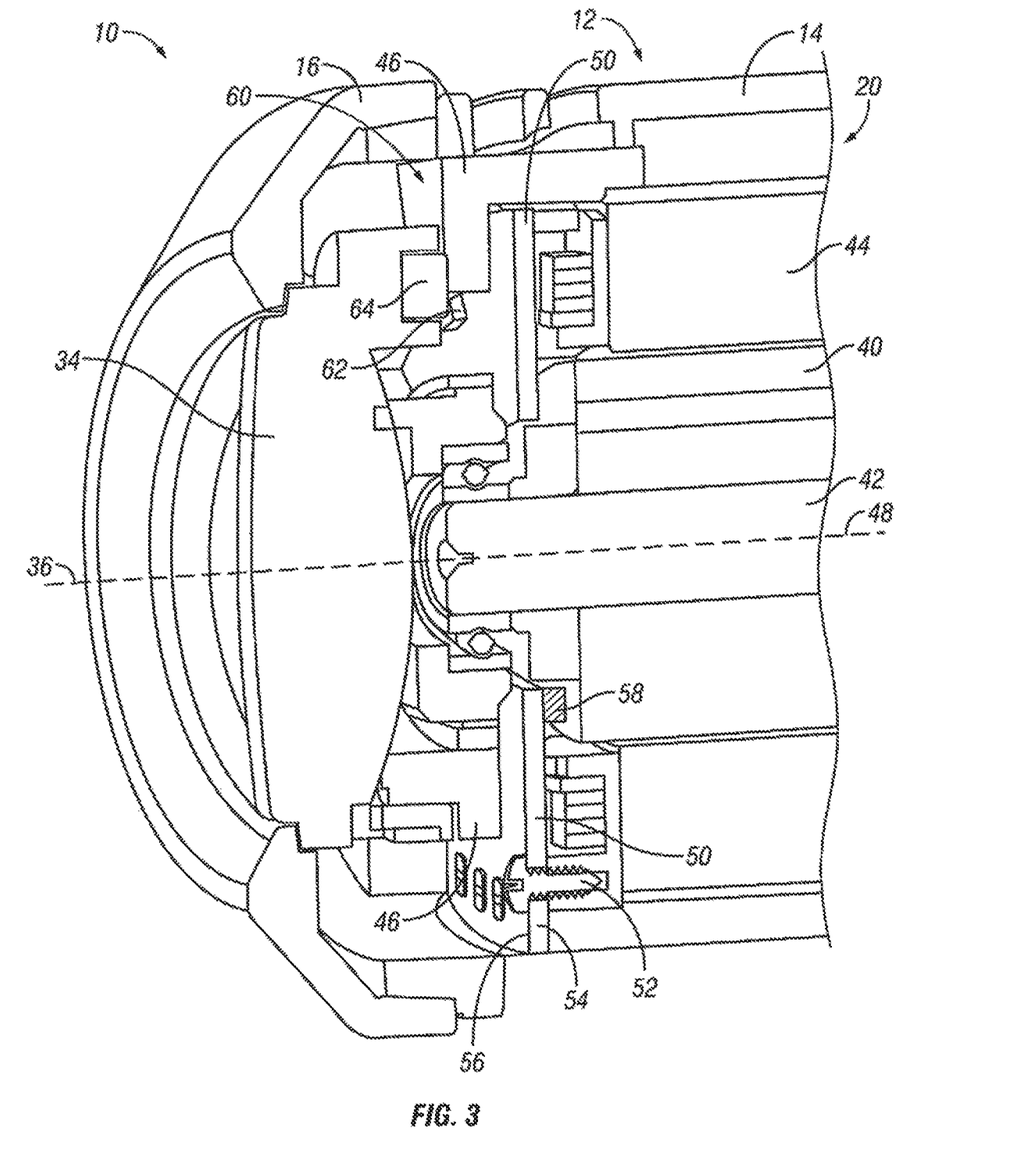
FIG. 3 is a magnified sectional view, taken about line 3-3 of FIG. 2, of an embodiment of a sensor system supported by the rear portion of the power tool.

Referring now to FIG. 3, the body 14 and the cap 16 of the tool housing 12 are broken away to show components of the motive source 20. The motive source 20 is illustratively embodied as a brushless DC electric motor. The motive source 20 includes a rotor 40 configured to drive an output shaft 42 to output mechanical power and a stationary component (i.e., a stator) 44 that extends around the rotor 40.

Motive source 20 such as a motor also includes a rear endbell 46 that abuts the control knob 34 and front endbell (not shown) that is spaced from the rear endbell 46 and positioned closer to the output end 24 of the power tool 10 than the rear endbell 46. The rotor 40 and the stator 44 are positioned between the two endbells. The front endbell and the rear endbell 46 cooperate to align the rotor 40 and the stator 44 so that the rotor 40 and the stator 44 extend parallel to a central axis 48 of the motor 20. The rear endbell 46 illustratively includes piloting features and indexing features that interface with the control knob 34, as shown and described in U.S. Provisional Patent Application Ser. No. 62/171,673, filed Jun. 5, 2015. The piloting features interface with the control knob 34 to guide rotation of the control knob 34 relative to the tool housing 12 about the knob axis 36 between the mode positions 38.

Motive source 20 includes a printed circuit board (PCB) 50 positioned near the rear endbell 46 and configured to provide motor control of the motive source 20. Typically, the PCB 50 is used to support electrical components of the motive source 20, such as sensors used to detect rotor position and terminals for the motor windings. The illustrative PCB 50 is annular in shape and fixed to the motor 20 with one or more fasteners 52. The PCB 50 includes an outer side 56 configured to face the rear endbell 46 and an opposing inner side 54. The terminals for the motor windings (not shown) are positioned on the inner side 54 of the PCB 50. Additionally, in some embodiments, rotor position sensors 58 (e.g., Hall-effect sensors) are positioned on the inner side 54 of the PCB 50 near the rotor 40 and are configured to detect the position of the rotor 40.

As illustrated in FIG. 3, a sensor system 60 for determining the mode position 38 of the control knob 34 is integrated into the PCB 50 and the control knob 34. The sensor system 60 is configured to detect an input selected by the user via the control knob 34 and communicate that selection to a controller of the power tool 10. The sensor system 60 includes one or more sensors 62 positioned on the outer side 56 of the PCB 50 and one or more sensor actuators 64 positioned on the control knob 34. In the illustrative embodiment shown in FIG. 3, the one or more sensors 62 are embodied as Hall-effect sensors 62 positioned on the outer side 56 of the PCB 50 at locations corresponding to several mode positions 38 of the control knob 34. Additionally, in the illustrative embodiment of FIG. 3, the one or more sensor actuators 64 are embodied as one or more permanent magnets 64 configured to generate magnetic fields that induce a voltage response in the corresponding Hall-effect sensors 62. By incorporating the sensor system 60 directly into the PCB 50, the complexity of the power tool 10 may be reduced by eliminating an additional PCB board associated solely with the user interface 32 of the power tool 10. Because the illustrative Hall-effect sensors 62 are contactless, the user interface 32 of the power tool 10 may be better able to withstand the vibrational forces induced by the illustrative impact tool, in embodiments using Hall-effect sensors for both the sensor system 60 of the user interface 32 and the rotor position sensors 58 of the motor 20, the PCB 50 may include shielding (e.g., steel shielding) to prevent interference between the permanent magnets 64 of the control knob 34 and the rotor position sensors 58.

In the illustrative embodiment, three Hall-effect sensors 62 are mounted on the outer side 56 of the PCB 50 and a single permanent magnet 64 is positioned in the control knob 34 adjacent to the outer side 56 of the PCB 50. The piloting and indexing features of the control knob 34 are configured to position the permanent magnet 64 near the corresponding Hall-effect sensors 62 that corresponds to a particular mode position 38. For example, when the control knob 34 is in a first mode position 38, the magnet 64 is adjacent to a first Hall-effect sensor 62 and the magnetic field generated by the magnet 64 excites the first Hall-effect sensor 62 to indicate to the controller of the power tool 10 to operate in a first mode of operation. Similarly, a second mode position 38 corresponds to a second Hall-effect sensor 62 and a third mode position 38 corresponds to a third Hall-effect sensor 62. When the control knob 34 is in a fourth mode position 38, the magnet 64 is not positioned to excite any of the three Hall-effect sensors 62. The controller of the power tool 10 causes the motive source 20 to operate in a fourth mode of operation when no signal from any Hall-effect sensor is detected. It should be appreciated that the first, second, third, and fourth mode positions 38 need not be positioned in sequential order in the power tool 10. In an alternate embodiment for forth mode position 38, magnet 64 may be positioned adjacent a fourth Hall-effect sensor 62 where the magnetic field generated by magnet 64 excites fourth Hall-effect sensor 62 to indicate to the controller of power tool 10 to operate in the fourth mode of operation. In illustrative embodiments, a different configuration of sensor actuators 64 and sensors 62 may be used. For example, the control knob 34 may include two permanent magnets 64 and the PCB 50 may include two Hall-effect sensors 62 that cooperate to define four separate modes of operation of the power tool 10. It will also be appreciated that the user interface 32 may be designed to have any number of mode positions 38.

Figure 4:
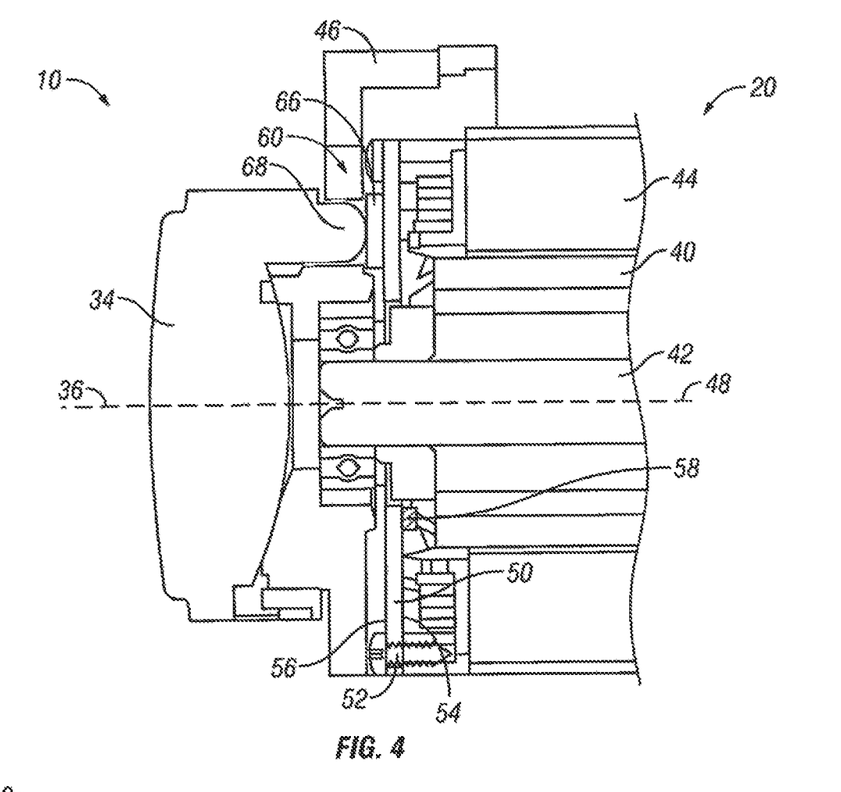
FIG. 4 is a magnified sectional view, taken about line 3-3 of FIG. 2, of another embodiment of the sensor system supported by the rear portion of the power tool.
Figure 5:
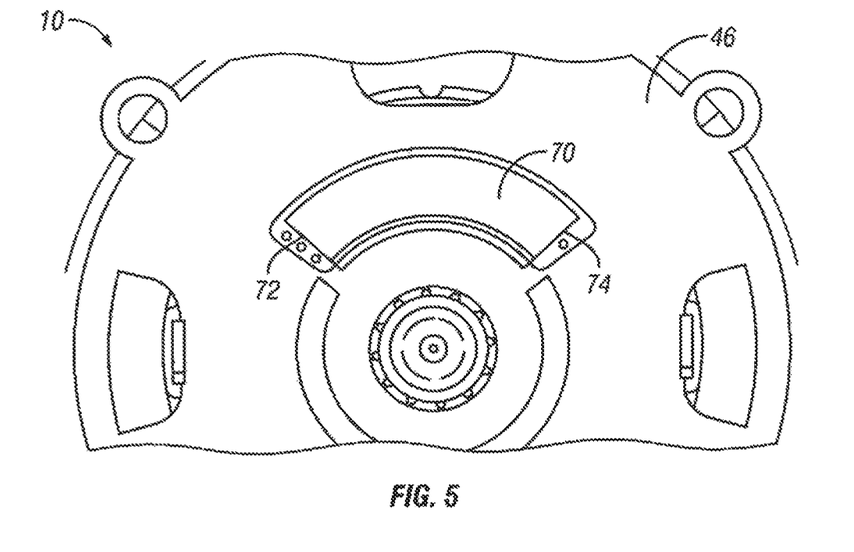
FIG. 5 is a magnified sectional view, taken about line 4-4 of FIG. 2, of the sensor system of FIG. 4.

FIGS. 4 and 5 show another embodiment of the sensor system 60 where the one or more sensors 62 include an arcuate potentiometer 66 and the one or more sensor actuators 64 include a plunger 68. The potentiometer 66 is positioned on the outer side 56 of the PCB 50 and includes a membrane 70 that includes a first end 72 and a second end 74. The potentiometer 66 is configured to change an output current based on a variable resistance determined by the interaction of the plunger 68 with the membrane 70. The plunger 68 is positioned on the control knob 34 such that it contacts the membrane 70 and is configured to change the resistance of the potentiometer 66 based on the location of the plunger 68 on the membrane 70. For example, if the plunger 68 is contacting the membrane 70 at the first end 72, the potentiometer 66 may have a first resistance that the controller interprets to indicate that the power tool 10 is to operate in a first mode of operation. Similarly, different locations of the plunger 68 on the membrane 70 cause the potentiometer 66 to have a second, third, or fourth resistance that corresponds to a second, third, or fourth mode of operation respectively. As noted above, it should be appreciated that, in some embodiments, the power tool 10 may include more (or less) than four mode positions 38 and more (or less) than four modes of operation that the user may select. Both the Hall-effect sensor embodiment of the sensor system 60 and the potentiometer embodiment of the sensor system 60 are adapted to withstand the vibrations that may be present in an impact tool.

In other embodiments, the sensor system 60 may be embodied as magnetic transducers (e.g., Hall-effect sensors, switches, angle sensors etc.), linear and rotary membrane potentiometers, or mechanical contacts which would be used for detecting the mode of operation selected by the user and communicating that selection to the controller of the power tool 10.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A hand-held power tool comprising:
a tool housing defining an interior space;
a motive source including an electric motor and a rear endbell positioned within the interior space;
a cap coupled to the tool housing and configured to close the interior space;
a trigger communicatively coupled to the motive source, the trigger being positioned on the tool housing for engagement by a user and structured to communicate a signal to activate and deactivate operation of the motive source;
a printed circuit board positioned within the interior space proximate to the rear endbell of the motive source and fixed to the electric motor, the printed circuit board having an outer side and an inner side, the outer side facing away from the motive source;
a user interface including a control knob, the control knob supported by the cap and abutting the rear endbell, the control knob being selectively rotatable among a plurality of mode positions, each mode position of the plurality of mode positions corresponding to a different operation mode of the motive source; and
a sensor system integrated into the printed circuit board and configured to detect the mode position of the control knob, the sensor system comprising a plurality of sensors positioned on the outer side of the printed circuit board and one or more sensor actuators on the control knob and displaceable relative to one or more of the plurality of sensors via rotation of the control knob.

2. The hand-held power tool of claim 1, wherein the rear endbell is configured to align a rotor and a stator of the electric motor so that the rotor and stator extend parallel to a central axis, and wherein the rear endbell guides a rotation of the control knob along the plurality of mode positions.

3. The hand-held power tool of claim 2, wherein the control knob is displaceable about a knob axis that is parallel to the central axis of the electric motor.

4. The hand-held power tool of claim 1, wherein each sensor of the plurality of sensors is positioned at a location on the printed circuit board that corresponds to a different one of the plurality of mode positions of the user interface.

5. The hand-held power tool of claim 4, wherein the one or more sensor actuators comprises one or more permanent magnets and wherein one or more of the plurality of sensors comprises a hall effect sensor.

6. The hand-held power tool of claim 1, wherein the one or more sensors comprises an arcuate potentiometer and the one or more sensor actuators comprises a plunger, the arcuate potentiometer having a membrane that is engaged by the plunger, an output current outputted by the arcuate potentiometer being adjustable based on an adjustment in a location of the engagement of the plunger with the membrane.

7. The hand-held power tool of claim 1, wherein the trigger is displaceable to a fully depressed position, and wherein when the trigger is at the fully depressed position, each of the plurality of mode positions correspond to a different maximum power that is supplied to the motive source.

8. The hand-held power tool of claim 2, wherein electrical connections of the electric motor are connected to the inner side of the printed circuit board.

9. The hand-held power tool of claim 2, including rotor position sensors disposed on the inner side of the printed circuit board, the rotor position sensors configured to detect a position of the rotor.

10. A hand-held power tool comprising:
a tool housing defining an interior space;
a motor positioned within the interior space;
a cap coupled to the tool housing and configured to close the interior space;
a trigger communicatively coupled to the motor, the trigger positioned on the tool housing and configured to communicate a signal to activate and deactivate operation of the motor;
a circuit board positioned within the interior space fixed to the motor, the printed circuit board having an outer side and an inner side, the outer side facing away from the motor;
a control knob having an outer surface configured to be grasped and an inner surface, the control knob supported by at least one of the cap or the tool housing so that the inner surface is adjacent to the outer surface of the circuit board, the control knob selectively rotatable among a plurality of circularly-arranged mode positions, each mode position of the plurality of circularly-arranged mode positions corresponding to a different operational mode of the motor; and a sensor system configured to detect the mode position of the control knob, the sensor system including a plurality of Hall effect sensors circularly disposed on the outer side of the circuit board and a sensor actuator disposed on the inner surface of the control knob, wherein respective ones of the plurality of Hall effect sensors are configured to be actuated by the sensor actuator to detect the mode position of the control knob.

* * * * *